No. 619,516. Patented Feb. 14, 1899.
J. TILLOTSON.
FASTENING FOR FURNITURE.
(Application filed Aug. 17, 1898.)

(No Model.)

WITNESSES:
H. P. Raleigh
Palmer A. Jones.

INVENTOR:
James Tillotson
By Moulton & Flanders,
attys.

UNITED STATES PATENT OFFICE.

JAMES TILLOTSON, OF GRAND RAPIDS, MICHIGAN.

FASTENING FOR FURNITURE.

SPECIFICATION forming part of Letters Patent No. 619,516, dated February 14, 1899.

Application filed August 17, 1898. Serial No. 688,759. (No model.)

*To all whom it may concern:*

Be it known that I, JAMES TILLOTSON, a citizen of the United States, residing at Grand Rapids, in the county of Kent and State of Michigan, have invented certain new and useful Improvements in Fastenings for Furniture; and I do hereby declare the following to be a full, clear, and exact description of the invention, such as will enable others skilled in the art to which it appertains to make and use the same.

My invention relates to improvements in fastenings for furniture, and more particularly to fastenings for securing toilet-frames to bureaus; and its object is to provide the same with certain new and useful features hereinafter more fully described, and particularly pointed out in the claims, reference being had to the accompanying drawings, in which—

Figure 1:
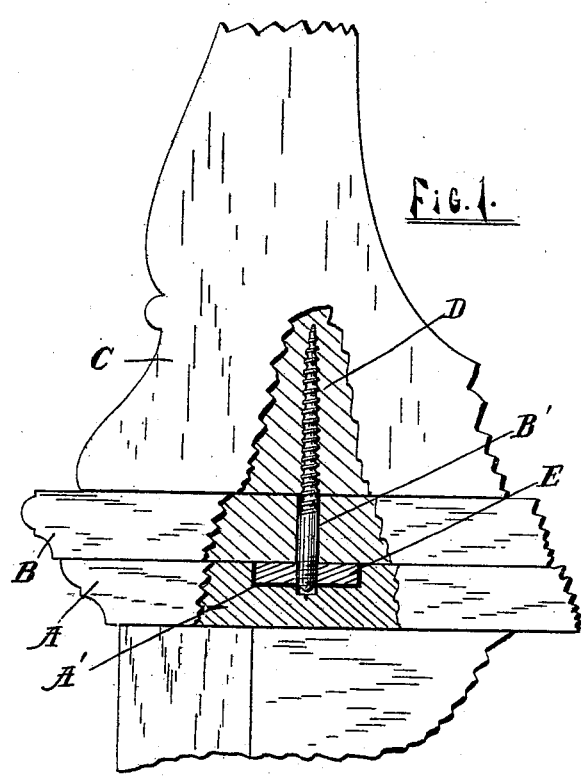
Figure 3:
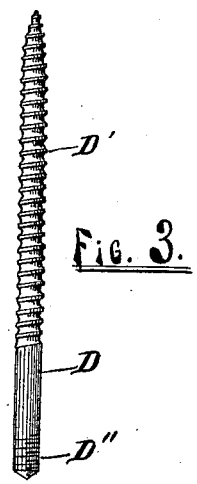
Figure 2:
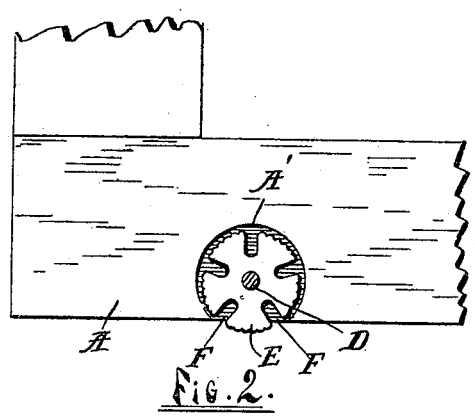
Figure 4:
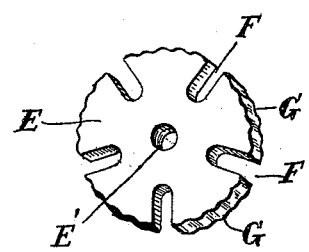

Figure 1 is a rear elevation of a portion of a bureau and toilet-frame with parts broken away to show the construction. Fig. 2 is a plan view of the bureau-frame with the nut of the fastener in place; Fig. 3, an enlarged detail of the bolt, and Fig. 4 an enlarged detail of the nut.

Like letters refer to like parts in all of the figures.

A represents the frame of a bureau or other article of furniture, B the top of the same, and C a toilet-frame or any other article to be secured in place.

My improvement consists, essentially, in providing a bolt immovably attached to the toilet-frame and projecting therefrom and a nut having radial openings for inserting a lever and rotative in a recess in the top of the bureau and projecting from the said recess sufficiently to permit of inserting the lever in the radial openings and turning the nut, said recess having a central opening to retain the nut and prevent its being detached from the bureau-top, as hereinafter more particularly described.

In the top of the frame A is a circular chamber A' to receive the nut E, so located that a portion of the nut extends outside the frame and is exposed sufficiently to permit of inserting a suitable lever in the recesses F and to turn the nut therewith, and at the same time the nut is sufficiently inclosed to be retained in the said chamber, such exposed portions being a segment sufficient to include at least two of the radial recesses F. The top B is provided with a suitable opening B' above the nut E, through which the metal-threaded end D'' of the bolt D passes and engages the threaded opening in the nut. The wood-screw end of said bolt is permanently inserted in the lower part of the toilet-frame C. When the bolt is thus inserted in the toilet-frame C and the nut in the recess A', neither of them will get misplaced, and when the parts to be attached are brought together they will both be where needed. The parts can then be quickly and readily attached by passing the end D'' of the bolt through the opening B' and engaging it with the opening E' and turning the nut E by the fingers applied to the exposed portion of the corrugated edge G and finally tightening the nut by any suitable lever inserted in the recess F.

Having thus fully described my invention, what I claim, and desire to secure by Letters Patent, is—

1. The herein-described means of securing two separable parts of furniture, one of said parts provided with a chamber having a contracted lateral opening, a nut retained in said chamber and projecting through said opening and having radial recesses, and a bolt fixed in the other of said parts and engaging the nut, substantially as described.

2. In an article of furniture composed of two separable parts, a circular chamber in one of said parts and having a lateral opening less than the diameter of said chamber, a circular nut in said chamber of greater diameter than said opening and having a series of radial recesses in its periphery and also having a portion of its periphery projecting through said opening sufficient to expose two or more of said radial recesses, an axial opening above said chamber, and a bolt fixed in the other of said parts to pass through said axial opening and engage the nut, substantially as described.

3. The combination of a bureau having a circular chamber in its frame and a lateral opening of less diameter than said chamber and an axial opening above the chamber, a circular nut in the chamber of greater diameter than said lateral opening and having radial recesses and also projecting through the lateral opening, and a toilet-frame having a bolt fixed therein and adapted to pass through said axial opening and engage the nut, substantially as described.

In testimony whereof I affix my signature in presence of two witnesses.

JAMES TILLOTSON.

Witnesses:
    LUTHER V. MOULTON,
    LOIS M. JONES.